Feb. 19, 1957  H. E. JOHNSON ET AL  2,781,680
UPPER CONTROL ARM STRAIGHTENER
Filed Sept. 16, 1953
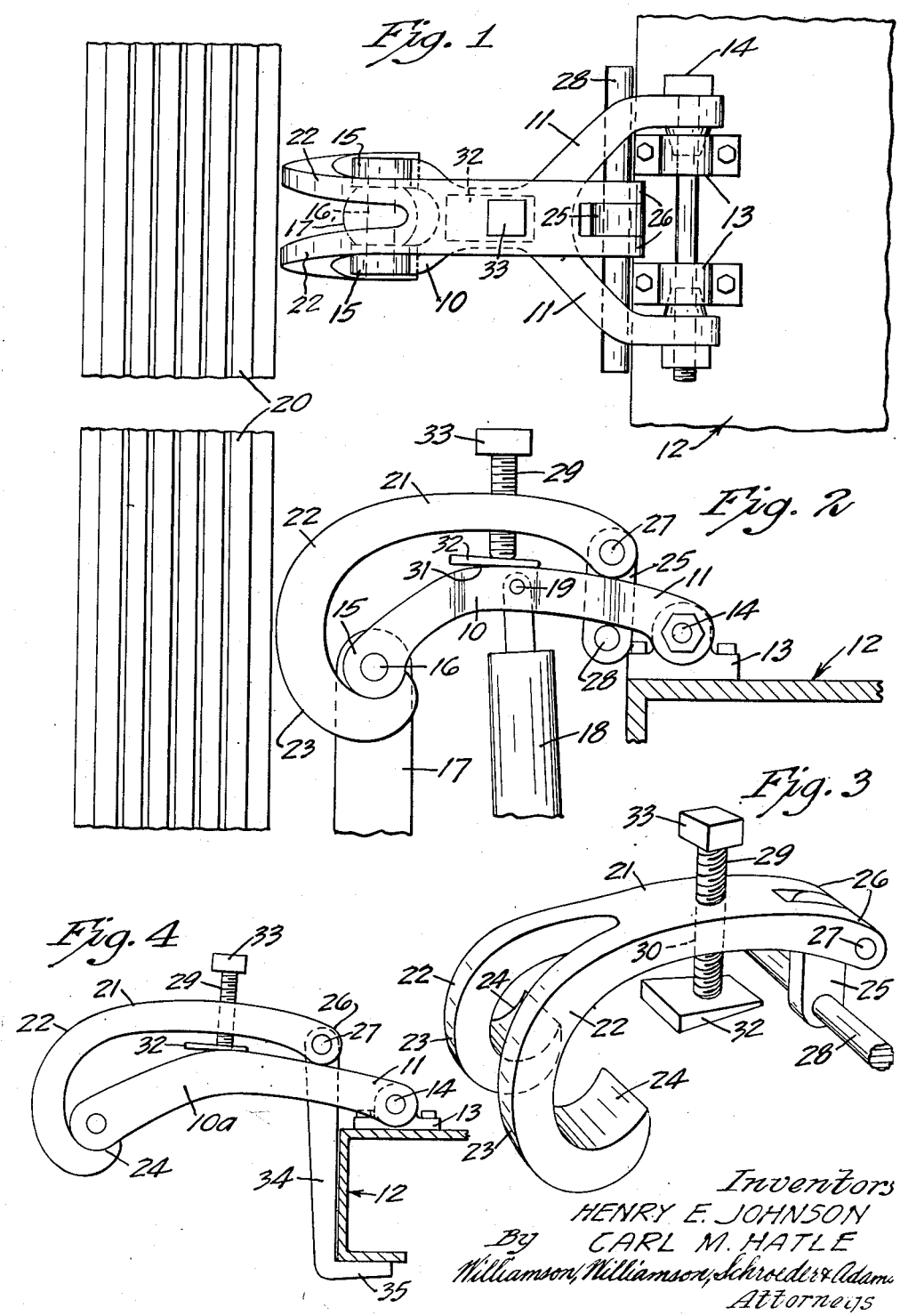
Inventors
HENRY E. JOHNSON
CARL M. HATLE
By Williamson, Williamson, Schroeder & Adams
Attorneys

United States Patent Office 2,781,680
Patented Feb. 19, 1957

2,781,680

UPPER CONTROL ARM STRAIGHTENER

Henry E. Johnson, Webster, and Carl M. Hatle, Roslyn, S. Dak.

Application September 16, 1953, Serial No. 380,553

1 Claim. (Cl. 81—15)

This invention relates to an auto mechanic's tool and more particularly to a device for straightening the upper control arms of an automobile wheel suspension assembly which have become unintentionally bent.

In the conventional front wheel suspension of a number of present day automobiles the wheel spindle is secured to an upper and a lower control arm. In many of these types of wheel suspensions a shock absorber is secured to the underside of the upper control arm and exerts considerable pressure thereon, especially when the automobile strikes holes or objects lying in the road. Even under lesser shocks, over a period of time, the upper control arm becomes bent at its medial portion, thus throwing the associated front wheel out of alignment. The king-pin assembly of such automobiles is provided with an eccentric bushing which will adjust camber, or deviation from the vertical, of the front wheel. The amount of eccentric adjustment is sufficient under normal circumstances to place the wheel at the proper position with respect to camber. Now, however, if the upper control arm has become bent, the upper end of the king-pin assembly will be pulled inwardly, thus causing the wheel to slant toward the framework of the car at its upper periphery. When this condition has been so exaggerated that the eccentric bushing can no longer compensate for it, then it becomes necessary to actually bend portions of the wheel assembly by force. The common method heretofore employed is to apply an expensive and cumbersome machine having a pressure of at least ten tons per square inch which will bend the spindle arms to a position which will compensate for the bent upper arm. Such procedure is obviously unsatisfactory because it involves bending a previously correct portion of the wheel assembly in order to compensate for another portion which has been unintentionally bent.

It is, therefore, an important object of this invention to overcome the above noted difficulties and to provide a device which is economical and simple in structure which will compensate for the misalignment of a wheel assembly caused by the bending of the upper control arm, by straightening the bent element itself.

It is another object of the invention to provide a tool for straightening upper control arms which is adapted to interfit with the parts comprising the wheel suspension without the necessity of removing the upper control arm from the automobile.

It is a further object of the invention to provide an upper control arm straightener having a removable portion in spaced relation with the reversely bent hook or gripping means which extension will be interchangeable so as to engage the automobile rigidly with respect to the upper control arm at positions depending on the type of automobile and the space available for inserting the device.

It is a still further object of the invention to provide an extremely simple and convenient tool which can interfit in close relation with an upper control arm, utilizing the limited space available to quickly and easily straighten the arm and restore the wheel assembly to its original alignment.

These and other objects and advantages of our invention will more fully appear from the following description made in connection with the accompanying drawings wherein like reference characters refer to similar parts throughout the several views and in which:

Fig. 1 is a top view of our upper control arm straightener in operative position overlying a bent arm and utilizing a depending extension having a transverse abutment pin in contact with the bifurcated legs of the upper control arm, unessential details of the automobile having been eliminated from the view;

Fig. 2 is a side view of the straightener device shown in Fig. 1, the framework of the automobile being shown in vertical section and other unessential portions cut away;

Fig. 3 is a perspective view of the device itself, the extension attached being of the type shown in Figs. 1 and 2; and Fig. 4 is a side view of an alternate form of the invention in which the end extension is engageable with the framework of the automobile rather than the underside of the control arm.

Referring now to the drawing, and particularly to Figs. 1 and 2, it is contemplated that our device be employed to straighten the upper control arm of an automobile front wheel suspension assembly, the upper control arm being of the type having a shank 10 terminating in bifurcated legs 11 which in turn are pivotally mounted to the automobile framework 12 by such means as bearings 13 and pin 14. The shank of the upper control arm has a pivotal connection at its outer end such as knuckle joint 15 attached by pin 16 to the king-pin assembly 17. The knuckle joint is formed so as to lie at each side of the king-pin assembly 17. A shock absorber 18 is generally secured through a pivotal connection 19 to a medial point on the shank 10 of the control arm. It is often the action of the shock absorber 18 which will cause the upper control arm to become bent in an upwardly direction as shown. The relationship of the wheel to the assembly is shown by the diagrammatic representation of a tire segment at 20.

Our invention lies in the device shown in one form in Fig. 3, the device being an automobile mechanic's tool constructed preferably of steel and providing a body portion 21 which is preferably elongated and adapted to overlie in moderately close clearance the upper surface of the control arm 10. The body portion 21 has a pair of bifurcated gripping members 22 each of which extends downwardly at 23, then reversely at 24 to provide hook-like finger elements for straddling and engaging the undersurface of the knuckle elements 15 at each side of the king-pin assembly 17.

In spaced relation with the gripping members 22 and preferably at the opposite end of our device is a depending extension 25 which is adapted to pass downwardly between the bifurcated legs or yoke 11 of the upper control arm as shown in Figs. 1 and 2. The depending extension is preferably mounted in a pivot connection formed by a clevis-type arrangement 26 having a removable pivot pin 27 extending through the upper end of the depending extension 25. The lower end of the extension bears an abutment member 28 which is adapted to engage rigidly the upper control arm so that force may be applied in an upward direction upon the tool. A bearing member such as the threaded rod 29 is medially mounted upon the body portion 21 of the tool and is disposed for lateral movement upwardly and downwardly as shown. We prefer a simple threaded engagement between the threaded rod 29 and a tapped opening 30 formed through the body 21 for alignment with the bent area 31 of the upper control arm 10 as shown in Fig. 2. A wedge block 32 may be supplied for providing a good bearing surface between the bearing member 29 and the bent area 31 of the control arm. The bearing member 29 may be provided with a head 33 adapted to engage with such conventional tool as a socket wrench.

The alternate form of the invention shown in Fig. 4 provides an end extension 34 which may be pivotally mounted through the same pivotal arrangement including pivot pin 27 and clevis 26, the extension 34 being somewhat longer than the extension 25 and having a laterally extending abutment 35 for engagement with the frame 12 rather than the undersurface of the control arm 10a. The arrangement shown in Fig. 4 may be preferred to that in Fig. 3 in some instances, especially in connection with automobiles in which small clearance necessitates the use of one or the other of the forms shown. In addition, it will be observed that the mechanical advantage is somewhat greater in the form shown in Fig. 4. The form of Fig. 3, however, places no strain upon the pivotal connection 13—14 whereas there is some strain placed upon the aforesaid pivot connection in the case of the alternate form of Fig. 4. It is presumed, of course, that the pivot connection between the upper control arm and the frame can withstand a corrective force if it were able to stand the shock which caused the bending in the first place.

In the use and operation of our device, we preferably remove the wheel from the assembly, having elevated the front end of the automobile by such means as a crank or jack. The bearing member is then retracted to allow the gripping or hook members to pass over the outer pivotal joint of the upper control member and to overlie the joint in pressing engagement. The appropriate depending extension 25 or 34 is then pivotally secured to the clevis 26 by means of removable pivot pin 27. The abutment 28 is then placed in contact with the underside of the upper control arm 10 or the abutment 35 is secured as by hooking into the framework 12 as the case may be. The bearing member is then advanced downwardly toward the upper surface of the upper control arm 10 in the area of the unintentional bend so as to tightly engage with the upper surface thereof. The bearing member is then further advanced so as to apply strain to the arm and cause it to bend correctively until the original form of the arm has been attained. The bearing member is then retracted, the abutment members removed and the device taken off the wheel assembly. The wheel may then be replaced if it has been removed and the eccentric bushing of the king-pin assembly can again be reactivated so as to provide the appropriate adjustment for camber in the wheel assembly.

It may thus be seen that we have devised a compact, simple and inexpensive tool which can correct the misalignment of a front wheel assembly caused by unintentional bending of the upper control arm, the device being mounted in a unique manner to interfit with the close clearances available and correcting the misalignment at the proper place rather than compensating for misalignment by bending the spindle mounting or otherwise ignoring the true source of trouble.

It will, of course, be understood that various changes may be made in the form, details, arrangement and proportions of the parts without departing from the scope of our invention.

What we claim is:

An auto mechanic's tool for straightening, in a wheel suspension assembly, an unintentionally bent upper control arm of the type joined pivotally at one end thereof to a king-pin journal and at the other end mounted pivotally in a pair of bifurcated legs to the framework of an automobile body, said tool comprising, a body portion for overlying said control arm, a pair of bifurcated downwardly and reversely formed straddling hooks formed integrally at one end of said body for underlying in pressing relation with the pivotal joint of the upper control arm at each side of the king-pin journal, a depending end extension pivotally attached to said body in spaced relation to said gripping members and adapted to pass downwardly and below the bifurcated legs of the upper control arm, an abutment member extending transversely outward from said depending end extension, said end extension being removable from the body and said pivotal connection and being securable in abutted relation with respect to said upper control arm, and a bearing member mounted medially of said body and having a substantially flat leading surface for advancing toward the upper surface of said upper control arm at the bent area thereof, whereby said bearing member may be moved with respect to the body portion of said tool to contact the bent area of the upper control arm and, upon further advancement, to correctively straighten said arm.

References Cited in the file of this patent

UNITED STATES PATENTS

| | | |
|---|---|---|
| 186,229 | Casterline | Jan. 16, 1877 |
| 902,716 | Cross | Nov. 3, 1908 |
| 1,319,434 | Tallman | Oct. 21, 1919 |
| 2,548,414 | Wilson | Apr. 10, 1951 |